United States Patent [19]

Roesler

[11] 4,363,689

[45] Dec. 14, 1982

[54] ADHESIVE BONDING PROCESS

[75] Inventor: Richard R. Roesler, New Brighton, Minn.

[73] Assignee: Henkel Corporation, Minneapolis, Minn.

[21] Appl. No.: 971,611

[22] Filed: Dec. 20, 1978

[51] Int. Cl.$^3$ .............................................. C09J 5/02
[52] U.S. Cl. ................................ 156/307.3; 156/275.5; 156/275.7; 156/332; 204/159.16; 204/159.17; 204/159.22; 427/407.1; 428/522; 428/523; 526/210; 526/320; 526/346
[58] Field of Search ............ 156/272, 334, 332, 275.5, 156/275.7, 307.3; 427/407 R, 407.1; 204/159.16, 159.17, 159.22; 428/522, 523; 526/210, 346, 320; 260/33.4 R

[56] References Cited

U.S. PATENT DOCUMENTS

| 3,100,760 | 8/1963 | Brown et al. | 428/522 |
| 3,547,851 | 12/1970 | Frauenglass | 260/33.4 R |
| 3,790,520 | 2/1974 | Ludwig | 260/33.4 R |

FOREIGN PATENT DOCUMENTS 567776  3/1945  United Kingdom ............... 156/272

Primary Examiner—John J. Gallagher
Attorney, Agent, or Firm—Forrest L. Collins

[57] ABSTRACT

Products are prepared containing a radiation-sensitive reactive material and a saturated polyol. The product is used to bond films either through radiation or free radical initiation. The product is usable for bonding such films as polyester, polyvinylchloride, polyethylene, nylon or acrylonitrile-butadienestyrene copolymers.

18 Claims, No Drawings

ADHESIVE BONDING PROCESS

CROSS-REFERENCE

Compositions of the type described herein are also described in U.S. Pat. No. 4,128,600 issued Dec. 5. 1978 to Skinner et al.

BACKGROUND OF THE INVENTION

1. Field of the Invention

This invention relates to products having utility as adhesives for use in bonding films to various substrate materials such as wood, paper, metal and plastics.

2. Description of the Art

The field of adhesive materials has undergone tremendous changes in recent years. One primary concern in the adhesive industry is the need to lower the emission of volatile hydrocarbons into the air. Under prior practices, adhesive compositions which are highly viscous were cut with a compatible solvent, such as benzene, toluene or xylene. These solvents aided in processing the composition during manufacture and in application to substrates.

In bonding the films to the substrate, the solvent is driven off by the thermal energy used to effect curing. As the thermal curing operation is ordinarily carried out by any number of end consumers, the resultant air quality in the consumer's plant and the atmosphere will depend on the steps which the consumer employs to trap the volatile emissions.

The problem facing the adhesive industry is, therefore, to provide products which cure rapidly and completely, firmly bonding the film to the substrate.

Smith, et al, in U.S. Pat. Nos. 3,935,330 issued Jan. 27, 1976, suggested a coating composition containing, as required components, a reactive thermoset cross-linker and a reactive solvent which is both thermal and radiation sensitive. Exemplary of the thermoset cross-linkers disclosed in Smith et al are polyfunctional oxiranes, urea/formaldehyde resins and melamine/formaldehyde resins. The reactive solvents are generally described as materials containing both a vinyl polymerizable double bond and a functional group which is reactive under thermal activation.

The oligomers formed through the processing described in Smith et al are fully cross-linked or a penetrated resin composition. That is, the oligomers are a single, continuous complex and randomly formed through the common thermosetting functional group. The Smith patent also contemplates the addition of materials which will function to increase the molecular weight of the reactive solvent in the radiation curing step. These latter materials which are called radiation sensitive reactive components will copolymerize through a vinyl radical in the reactive solvent. The resultant copolymer which still maintains its thermal curing functionality then forms a higher molecular weight oligomer with the reactive thermoset cross-linker.

The deficiency in the compositions disclosed by Smith et al lies in the properties of the penetrated oligomer. Specifically, the fact that the oligomer contains at least two thermosetting components and up to two different vinyl containing components leads to a considerable variance in the physical properties of oligomer. That is the variance in the molecular weight of the reactive solvent following the radiation cure must be considered in formulating the end product (oligomer). Similarly, the structure and molecular weight of the reactive solvent must be factored if the additional radiation sensitive component is present to predict the properties of the oligomer. Moreover, the final structure of the penetrated oligomer will vary considerably, if the reactive solvent has not been sufficiently cured by the radiation. That is, the reactive solvent is fully capable of undergoing thermal crosslinking even in the absence of any radiation curing. While this tends to lessen volatility when the radiation cure is incomplete the result is an unpredictably structured oligomer.

U.S. Pat. No. 3,028,367 issued Apr. 3, 1962 to O'Brion teaches the formation of thermosetting resins comprising a copolymer of a hydroxy alkyl acrylate and an alkyl acrylate together with a dihydric or trihydric alcohol and an organic diisocyanate. Organic thiol compounds are shown as useful in controlling the molecular weight of the copolymer portion of the resin. The copolymer which is hydroxy functional is preferably prepared using a free radical liberating agent in the presence dimethylformamide as a solvent. The solvent is removed following the preparation of the copolymer. The final resin composition is then prepared by reacting the copolymer with the alcohol and the isocyanate. Apparently the copolymer is of sufficiently low molecular weight that no solvent is required to lower the viscosity during application to a substrate.

Shur et al in U.S. Pat. No. 3,772,062 issued Nov. 13, 1973 discloses fiber-board coating compositions which are fully cured by actinic radiation. That is, the compositions are penetrating to the extent that all the components contain acrylic groups which are subject to free radical initiated bonding. The use of thermal energy for curing is stated to be avoided by the reference. The difficulty in attempting to use fully radiation cured resins is the lack of physical strength due to incomplete curing leaving a residue of acrylic monomer in the coating. U.S. Pat. No. 3,776,729 to Levy et al issued Dec. 4, 1973 suggests washing off the non-polymerized monomer following the radiation cure. It is easily observed that fully radiation curable compositions are undesirable unless the cure is complete both from a cost and environmental view. Furthermore the inconsistence in the coating which results where not all the monomer has been cured or washed off can produce a product which will discolor or crack when exposed to later sources of radiation, i.e. sunlight.

Additional references which may be of use in the present invention include U.S. Pat. No. 3,719,638 issued to Huemmer et al on Mar. 6, 1973, U.S. Pat. No. 4,025,346 issued to Petke et al on May 24, 1977, U.S. Pat. No. 3,509,234 to Burlant et al issued Apr. 28, 1970 and U.S. Pat. No. 3,641,199 granted to Niederhauser et al on Feb. 8, 1972.

Further references include U.S. Pat. No. 3,886,229 to Hutchinson et al issued May 27, 1975, U.S. Pat. No. 3,929,929 to Kuehn dated Dec. 30, 1975, and U.S. Pat. No. 4,034,017 granted to Chang et al on July 5, 1977. Still further references include the Encyclopedia of Polymer Science and Technology Vol. II pps. 42–61 Japanese Pat. No. 74/97,049 dated Sept. 13, 1974 to Hasegawa et al and British Pat. No. 567,776 dated Mar. 2, 1945. Also of interest herein are U.S. Pat. No. 4,034,145 to Gruber et al issued July 5, 1977, U.S. Pat. No. 3,897,295 to Dowbenko et al issued July 29, 1975, U.S. Pat. No. 3,770,490 granted Nov. 6, 1973 to Parker, and U.S. Pat. No. 3,725,115 to Christenson issued Apr.

3, 1973. Further patents of interest include U.S. Pat. No. 3,720,656 issued to Manabea on Mar. 13, 1973, U.S. Pat. No. 3,682,875 granted Aug. 8, 1972 to O'Sullivan et al, and U.S. Pat. No. 4,113,894 issued to Koch on Sept. 12, 1978.

All of the foregoing to the extent applicable to the present invention are herein incorporated by reference.

Throughout the specification and claims temperatures are in centigrade degrees and percentages and ratios are by weight unless otherwise indicated.

SUMMARY OF THE INVENTION

A process for bonding a film selected from the group consisting of nylon, polyester, polyvinyl chloride, polyethylene, and acrylonitrilebutadiene-styrene copolymers to a substrate comprising contacting the substrate with an adhesive of the formula:

(a) from about 40% to about 90% by weight of a saturated polyol; and,
(b) from about 10% to about 60% by weight of a reactive material having a radiation sensitive pi bond and having a boiling point greater than that of benzene, and mixtures thereof; and, positioning the film and the substrate such that the adhesive is between the substrate and film and thereafter polymerizing the reactive material to effect bonding.

DETAILED DESCRIPTION OF THE INVENTION

The present invention contemplates a process for bonding a film to a substrate. The term substrate includes wood, glass, metals such as aluminum and steel, paper, plastics and also includes film to film bonding as well. In the contemporary preparation of polyols an inert ingredient such as toluene or xylene is often included to facilitate processing. One aspect of the present invention deals with the displacement of these volatile inert solvents by distillation. Prior to the distillation process the reactive material containing at least one radiation sensitive pi bond is substituted as the carrier or solvent for the polyol.

The reactive material should not initially be present with the polyol if the polyol is to be formed through acrylic links in the prepolymer. That is where the polyol is for example a hydroxy-functional copolymer of methyl methacrylate, butyl acrylate, and hydroxyethyl acrylate formed through coupling of the acrylic groups the presence of the reactive diluent initially would result in a copolymer linked to the reactive material. In such cases the inert solvent is required until the saturated polyol has been formed and is substantially free of active acrylic (pi bond) groups. Particular examples of forming the saturated polyol from vinyl monomers in the presence of the inert solvent are discussed later in the specification.

Where the reactive material would not undergo polymerization through vinyl linkage with the monomers used to form the polyol all the components may be processed to the exclusion of the inert solvent. However, it is still desirable to process the polyol in the presence of the inert solvent as the latter material in any event is a superior to most of the reactive materials for that purpose. That is, inert solvents such as toluene provide lower viscosity and thus easier processing of the polyol.

Therefore in most aspects of the present invention a mixture of the saturated polyol and the reactive material will be separated from the inert solvent by distillation.

The first parameter for the reactive material is therefore that it must have a boiling point above that of benzene which is a common inert solvent. More preferably the boiling point of the reactive material is greater than that of toluene another suitable inert solvent. For most embodiments the boiling point of the reactive material is between about 120° and 300° C. where the upper temperature is reflective of the need to maintain a sufficiently low viscosity of the mixture of the saturated polyol and the reactive material. To effect complete removal of the inert solvent by distillation the inert solvent and the reactive material should not form an azeotropic mixture.

It is preferred that the reactive material be difunctional with respect to the radiation sensitive pi bond functional groups. The difunctionality ensures that cross-linking rather than linear polymerization is obtained during the radiation curing step. The same effect of difunctionality is obtained with a monofunctional reactive material if during the radiation cure a sufficient amount of a difunctional reactive material is present to ensure some cross-linking. Thus, if monofunctional reactive materials are utilized a difunctional reactive material is preferably present in a weight ratio of from about 4:1 to about 1:4 to the monofunctional reactive material. Preferably this ratio is from about 3:1 to about 1:3.

Where the polyol is formed by polymerization through a vinyl link (radiation sensitive pi bond) it is understood that the reactive material should not be present during polyol formation as the reactive material would then undergo a similar reaction leading to undesirable by-products. While the reactive material must not contain radicals which would be thermally reactive substituents which are non-reactive are permissible.

In addition to the foregoing requirements the reactive material preferably has a molecular weight of from about 80 to about 800, more preferably about 100 to about 400. Compounds meeting the molecular weight requirement are suitable to lower the viscosity of the polyol.

Examples of monofunctional reactive materials include the esters of acrylic and methacrylic acid such as methyl acrylate, methyl methacrylate; ethyl acrylate and methacrylate; propyl and isopropyl acrylate and methacrylate; butyl, isobutyl, and tertiary butyl acrylates and methacrylates; n-pentyl and the isopentyl acrylates and methacrylates; n-hexyl and the isohexylacrylates and methacrylates.

Other monofunctional vinyl reactive materials include the n-heptyl and iso-heptyl acrylates and methacrylates; and octyl and the iso-octyl acrylates and methacrylates. Of this latter category an especially preferred reactive material is 2-ethylhexyl acrylate.

Further examples of suitable diluents material are the acrylates and methacrylates of the normal and isomeric forms of nonyl, decyl, undecyl, dodecyl, tridecyl and tetradecyl alcohols. Moreover the foregoing esters of acrylic and methacrylic acid may contain non-radiation sensitive unsaturation in the alcohol radical as well.

Additional monofunctional radiation active pi bond compounds which may be used as a reactive material include diallyl maleate, diallyl fumarate, vinyl acetate and N-vinyl-2-pyrrolidone, especially the latter compound. The maleate and fumarate compounds actually contain three carbon-carbon pi bonds however only the interior double bond in the maleic (or fumaric) acid backbone is reactive to ultraviolet radiation. Examples of an aromatic monofunctional radiation sensitive pi bond reactive material are vinyl toluene and styrene.

The highly preferred reactive materials of the present invention are those having more than one radiation sensitive pi bond. Such compounds are ordinarily the esters of acrylic or methacrylic acid and a polyhydric alcohol.

Examples of the foregoing difunctional reactive materials are ethylene glycol diacrylate and dimethacrylate; 1,2-propylene and 1,3-propylene glycol diacrylate and dimethacrylate. Similarily the diol diacrylates and dimethacrylates of butane, pentane, hexane, heptane and so forth through the thirty-six carbon diol are useful in the present invention as reactive diluents. Of particular interest are 1,6-hexane diol diacrylate, diethylene glycol diacrylate, trimethylol propane triacrylate, and pentaerythritol tetraacrylate.

The second component of the present invention is the saturated polyol. The purpose of the polyol in the present invention is not fully understood in that it appears chemically unreacted even after the film is bonded to the substrate. It has been observed, however, that the saturated polyol is nonetheless necessary for the adhesive product to bond the film to the substrate.

The saturated polyol may be an alkyl or cycloalkyl polyol, an ester linked polyol, an ether linked polyol, an ether and ester linked polyol or hydroxy functional acrylic copolymers. A general definition of the polyols is obtained above from the polyhydric alcohols which were condensed with the acrylic and methacrylic acid to form the reactive materials. That is the precursor polyhydric alcohol definition for use in making the reactive materials is identical to that of the saturated polyol.

Specific examples of alkyl and cycloalkyl polyols include 2,5-hexanediol available from Aldrich Chemical, 1,6-hexanediol, available from Celanese Chemical, ethylene glycol available from Baker, Dimerol a 36 carbon essentially linear diol available from General Mills Chemicals, Inc., glycerol, 1,2,6-hexanetriol available from Union Carbide, pentaerythritol, and 1,4-cyclohexane diol. Additional examples of such polyols include Polybd R-45HT a polybutadiene diol having an approximate molecular weight of 2800 available from Arco and Trimethylol propane available from Celanese.

The ester linked saturated diols of the present invention are more particularly described as polyols where the predominate linkage (functional group other than the hydroxyl) are ester radicals. The ester linked saturated polyols are structurally represented as

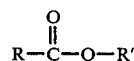

where R and R' are organic residues which contain at least two hydroxyl radicals and at least one ester link.

Examples of ester linked saturated polyols include Niax PCPO200 and PCPO250 both available from Union Carbide and having respective molecular weights of approximately 530 and 2000. Both of the foregoing compounds are polycaprolactone diols. Niax PCPO300 also available from Union Carbide is a Caprolactone-ester triol having approximate molecular weight of 540. Niax PCPO310 also available from Union Carbide is a Caprolactone-ester triol having a molecular weight of approximately 900.

The ether linked saturated polyols of the present invention include compounds such as diethylene glycol and triethylene glycol both available from Fisher. Further ether linked saturated polyols useful in the present invention include the Polymeg Q0650, Q0100, and Q0200 all of which are polybutylene ether diols available from Quaker having a respective molecular weight of approximately 650, 1000 and 2000. Pluarcol P1010 having an approximate molecular weight of 1050 available from Wyandotte is an example of a polypropylene oxide ether linked diol useful in the present invention. Similar Wyandotte products useful as saturated polyols in the present invention include Pluracol TP440 and 150 which are propylene oxide ether linked triols having respective molecular weights of approximately 425 and 1560. In similar fashion Pluaracol GP3030 is another saturated polyol suitable for the present invention available from Wyandotte. The foregoing material is a glycerine polypropylene ether linked triol having an approximate molecular weight of 2900.

Additional Pluracols useful in the present invention include Pluarcol PEP450 which is a pentaerythritol polypropylene oxide ether linked tetrol having an average molecular weight of 405, Pluracol PEP650 a polyoxypropylene derivative of pentaerythritol having an average molecular weight of 594, and Pluracol 493 an ether linked tetrol having a molecular weight of approximately 3630.

Ester and ether linked saturated polyols suitable in the present invention are described structurally as

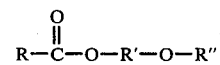

where R, R' and R" are organic residues containing at least two hydroxyl radicals and at least one ester and one ether linkage.

Hydroxyfunctional acrylic copolymers are easily obtained from a hydroxyfunctional acrylic (or methacrylic) compound such as hydroxypropylacrylate, hydroxyethyl acrylate or similar materials and one or more comonomers such as methyl methacrylate, styrene, or butylacrylate. These materials are available from the Henkel Corporation, Minneapolis, Minnesota under the G-Cure trademark.

A decided advantage in the process of the present invention is that difficult to bond materials such as Mylar, which is a poly(ethyleneterephthalate), polyethylene, polyvinylchloride, nylon, polyesters, and acrylonitrile-butadiene-styrene (hereinafter ABS) may be adhered to various substrates as previously stated. These various materials are well known in the art and thus no particular descriptions will be given here as one skilled in the art will quickly recognize the nature of these films.

UTILIZATION

The compositions of the present invention comprising the saturated polyol and the reactive material, are applied to the substrates such as wood, metal, paper, or plastics by any convenient method such as knife blade, brush, or spray and thereafter the film is placed on the adhesive coated substrate. The coated surface is then exposed to sufficient radiation which may be either particulate or non-particulate radiation to cure the reactive diluent through the radiation sensitive pi bonds. Suitable sources of particulate and non-particulate ionizing radiation include ultraviolet light or radioactive sources such as are described in U.S. Pat. No. 3,935,330 issued Jan. 27, 1976 to Smith et al. To enhance the rate of radiation curing of the reactive material free radical initiators may be included in the composition such as benzoin, benzoin ethers, Michler's Ketone and chlorinated polyaromatic hydrocarbons. Other free radical initiators are ordinarily organic peroxides, hydroperoxides, per acids, per esters, azo compounds, ditertiary butyl peroxide, cumene hydroperoxide, benzoyl peroxide, 2,4-dichlorobenzoyl peroxide, tertiary butyl hydroperoxide, 2,5-dimethyl-2,5-bis (hydroperoxy)hexane, peracetic acid, tertiary butyl perbenzoate, tertiary butyl peracetate, perbenzoic acid, tertiary butyl peroxypivalate, tertiary butyl peracetic acid and azo-bis-isobutyl nitrile. The free radical initiator may be present at from about 0.01 to about 20% by weight of the radiation curable components. Accelerators may also be included in similar amounts including N,N-dimethyl-p-toluidene, tri-normal butylamine, and benzhydrazine.

To ensure that the reactive material does not polymerize too soon a free radical inhibitor may be added to the mixture of the saturated polyol and the reactive material. Examples of suitable inhibitors include hydroquinone and the methyl ether thereof, butylated hydroxy toluene, trihydroxybenzene and nitrogen free radical at a level of from about 5 ppm to about 2000 ppm by weight of the radiation curable components.

The amount of radiation necessary to cure the reactive material will of course depend on the angle of exposure to the radiation, the thickness of the coating to be applied, and the amount of reactive material in the coating composition as well as the presence or absence of a free radical initiating catalyst. For any given composition experimentation to determine the amount of radiation sensitive pi bonds not cured following exposure to the radiation source is the best method of determining the amount and duration of the radiation required. It is also noted that the source of radiation must be able to penetrate the film and the substrate to effect adhesion, i.e. U.V. should not be used where the film or coating are U.V. opaque.

It is also noted that even though radiation curing is preferred the film may be bonded to the substrate without radiation provided that sufficient free radicals are generated via a suitable catalyst such as t-butylperbenzoate and di-t-butylperoxide or the other catalysts previously described.

Additional components which may be included in the present invention include pigments, dyes, reflective materials and so forth.

The following are examples of the present invention.

EXAMPLE I

An adhesive composition is prepared as follows: The components are used to form a hydroxy functional acrylic copolymer:

|  | Parts By Weight |
| --- | --- |
| xylene | 40 |
| methyl methacrylate | 25 |
| n-butylacrylate | 25 |
| hydroxy-ethyl acrylate | 8.82 |
| ditertiary butyl peroxide | 1.18 |
|  | 100.00 |

The acrylic functional compounds are placed in a premix tank and thoroughly stirred for 10 minutes. The ditertiary butyl peroxide is added to the premix tank and then stirred for 20 minutes.

A kettle is then set for reflux conditions and the xylene is charged into the kettle with a nitrogen sparge. One tenth of the premixed acrylic monomers and the ditertiary butyl peroxide are then added into the kettle. The limited addition of premix is useful in controlling the highly exothermic acrylic polymerization.

The mixture in the kettle is then stirred and refluxed at about 135° C. for about 15 minutes. The remainder of the premix is fed in to the kettle over a period of 90 minutes with constant reflux throughout the addition. After an additional one hour period a sample of the mixture in the kettle is withdrawn to determine the solids content which for the present example should be about 60% by weight.

The reaction mass is then cooled to a temperature below about 50° C. The hydroxy functional acrylic copolymer solution has a Gardner color of about 2, a viscosity of 30–50 poise, is clear and the solid resin has a hydroxyl value of 70–75 mg KOH per gram and a hydroxyl equivalent weight of 1274.

18.520 kilograms of the reaction mass are then mixed with 2.118 kilograms of Pluracol PEP650 which has an equivalent weight of 145.7. To this mixture 5.96 grams of hydroquinone are added to inactivate any trace of the ditertiary butyl peroxide catalyst. It is preferable to add hydroquinone in a heated portion of xylene to ensure that the former material is dissolved or dispersed. 4.77 kilograms of 1,6-hexane diol diacrylate (the reactive diluent) are then added to the kettle. Heat and vacuum are then simultaneously applied to distill off the xylene. The kettle temperature at this point is between about 55° and 65° C. with the vacuum at about 20 mm Hg.

The kettle is then maintained at about 60° C. under the highest possible vacuum until xylene distillation ceases usually in about one hour at 200 microns of absolute pressure.

When the distillation is completed the vacuum is opened to air and a sample is removed and tested for solids analysis. The resultant product is a clear, water white liquid having a viscosity of about 200 poise at 50° C. The solids content following distillation of the xylene is greater than 95% and the composition has a hydroxyl value of 110. The Gardner color value is 1- and a gas liquid chromatography test indicates that only about 1.5% of the xylene remains in the mixture following distillation.

The foregoing adhesive is utilized to bond a Mylar film 4 mm thick to an aluminum plate by applying the adhesive to the aluminum and thereafter adding the film. The adhesion is complete in about 10 seconds with a UV cure and is instantaneous if an electron beam is used. Substantially similar results are obtained with polyvinylchloride, polyethylene, nylon, or an ABS copolymer. Similar adhesives are obtained where the methyl methacrylate the butyl acrylate and the hydroxyethyl acrylate ingredients of the copolymer are combined in a molar ratio of from about 4:1:1 to about 1:4:3.

EXAMPLE II

An adhesive composition is prepared in the following manner:

The premix tank is charged with methylmethacrylate, styrene, n-butyl acrylate, and hydroxy-ethyl methacrylate and stirred for a period of about 10 minutes. Tertiary butyl perbenzoate is added as a free radical catalyst and stirring is continued for about 20 minutes.

The kettle is set for total reflux and charged with xylene as the inert solvent. Approximately 10 percent of the premix comprising the monomers and the free radical catalyst are added to the kettle. The nitrogen sparge is then set in the kettle.

The stirrer in the kettle is then activated and the kettle heated to reflux at from about 130°–135° C. under reflux conditions for a period of about 20 minutes. The remainder of the premix is fed in at a uniform rate over a period of about 4 hours maintaining reflux throughout the addition period. At about one hour after completion of the premix addition the solids and free monomer content of the composition in the kettle is determined to ensure substantial completion of the hydroxy functional acrylic copolymer.

The composition in the kettle comprises:

| Contents | Parts By Weight |
|---|---|
| xylene | 40.00 |
| methyl methacrylate | 19.16 |
| styrene | 19.16 |
| n-butyl acrylate | 6.77 |
| hydroxy-ethyl methacrylate | 12.64 |
| tertiary butyl perbenzoate | 2.27 |
| | 100.00 |

The mixture of the inert solvent, the free radical catalyst and the hydroxy functional acrylic copolymer containing methyl methacrylate, styrene, n-butyl acrylate, and hydroxyethyl methacrylate units form a clear solution having a Gardner color of 3, a viscosity of 35–45 poise and a hydroxyl value of 90–95 mg KOH per gram of solid resin.

The mixture is cooled to below 50° C. and the xylene is removed as in Example I and replaced with 13.61 parts of 1,6-hexane diol diacrylate as the reactive diluent.

The foregoing adhesive composition is then applied to a substrate. A transparent Mylar film is applied thereafter and ultraviolet radiation is employed to effect bonding. Alternatively sufficient t-butylperbenzoate is included and bonding is effected by free radical generation.

What is claimed is:

1. A process for bonding a film selected from the group consisting of nylon, polyester, polyvinyl chloride, polyethylene, and acrylonitrile-butadiene-styrene copolymers to a substrate comprising contacting the substrate with an liquid adhesive of the formula:
    (a) from about 40% to about 90% by weight of a saturated polyol; and,
    (b) from about 10% to about 60% by weight of a reactive material having a radiation sensitive pi bond and having a boiling point greater than that of benzene, and mixtures thereof; and, positioning the film and the substrate such that the adhesive is between the substrate and film and thereafter polymerizing the reactive material to effect bonding.

2. The process of claim 1 wherein the saturated polyol is an alkyl or cycloalkyl polyol.

3. The process of claim 1 wherein the saturated polyol is an ester linked polyol.

4. The process of claim 1 wherein the saturated polyol is an ether linked polyol.

5. The process of claim 1 wherein the saturated polyol is an ether and ester linked polyol.

6. The process of claim 1 wherein the reactive material is a fully substituted polyacrylate or polymethacrylate of a polyfunctional alcohol.

7. The process of claim 6 wherein the saturated polyol is a hydroxy functional acrylic terpolymer of:
    (a) methyl methacrylate;
    (b) butyl acrylate, and
    (c) hydroxyethyl acrylate.

8. The process of claim 7 wherein the reactive material is selected from the group consisting of diol diacrylates, triol triacrylates, and tetrol tetraacrylates and mixtures thereof.

9. The process of claim 8 wherein the reactive material is selected from the group consisting of:
    (a) 1,6-hexane diol diacrylate;
    (b) ethylene glycol diacrylate;
    (c) trimethylol propane triacrylate;
    (d) triethylene glycol diacrylate;
    (e) neopentyl diol diacrylate; and
    (f) pentaerythritol tetraacrylate,
and mixtures thereof.

10. The process of claim 9 wherein the reactive material is 1,6-hexane diol diacrylate at from about 20% to about 50% by weight and from about 50% to about 80% by weight of a hydroxyfunctional terpolymer of:
    (a) methyl methacrylate,
    (b) butyl acrylate, and
    (c) hydroxyethyl acrylate
in a molar ratio of a:b:c of from about 4:1:1 to about 1:4:3.

11. The process of claim 1 wherein the film is a polyester.

12. The process of claim 1 wherein the film is a nylon.

13. The process of claim 1 wherein the film is a polyvinylchloride.

14. The process of claim 1 wherein the film is a acrylonitrilebutadiene-styrene copolymer.

15. The process of claim 1 wherein the film is a polyethylene.

16. The process of claim 11 wherein the film is a polyethylene terephthalate.

17. The process of claim 1 wherein the reactive material is styrene.

18. The process of claim 1 wherein the saturated polyol is a polyoxypropylene derivative of pentaerythritol.

* * * * *